Aug. 9, 1932.  F. W. BECRAFT  1,870,485
MULTIPLEX ROTARY DRUM FILTER
Filed Oct. 17, 1930  2 Sheets-Sheet 1
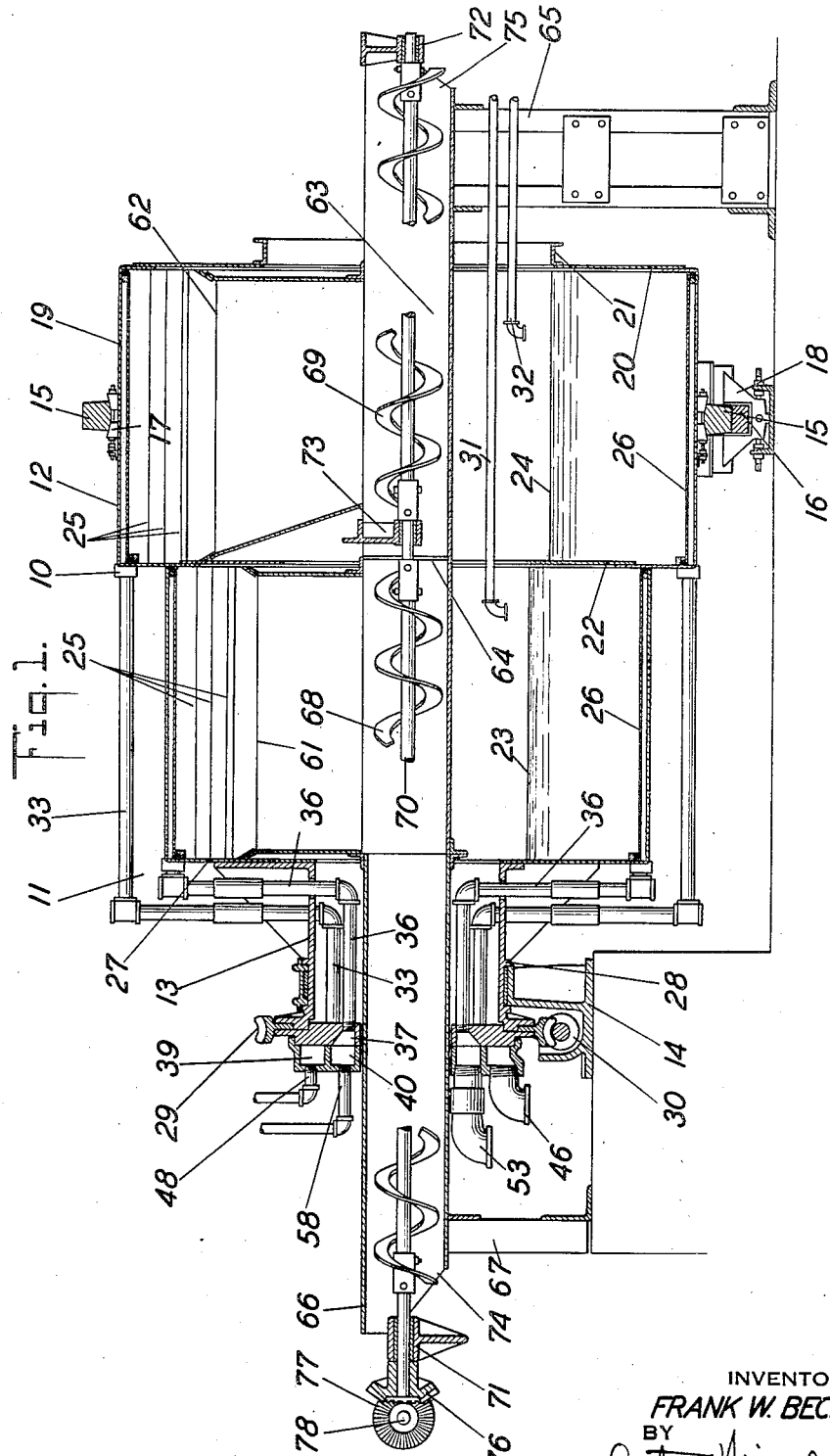
INVENTOR
*FRANK W. BECRAFT*
BY
ATTORNEY Aug. 9, 1932.    F. W. BECRAFT    1,870,485
MULTIPLEX ROTARY DRUM FILTER
Filed Oct. 17, 1930    2 Sheets-Sheet 2
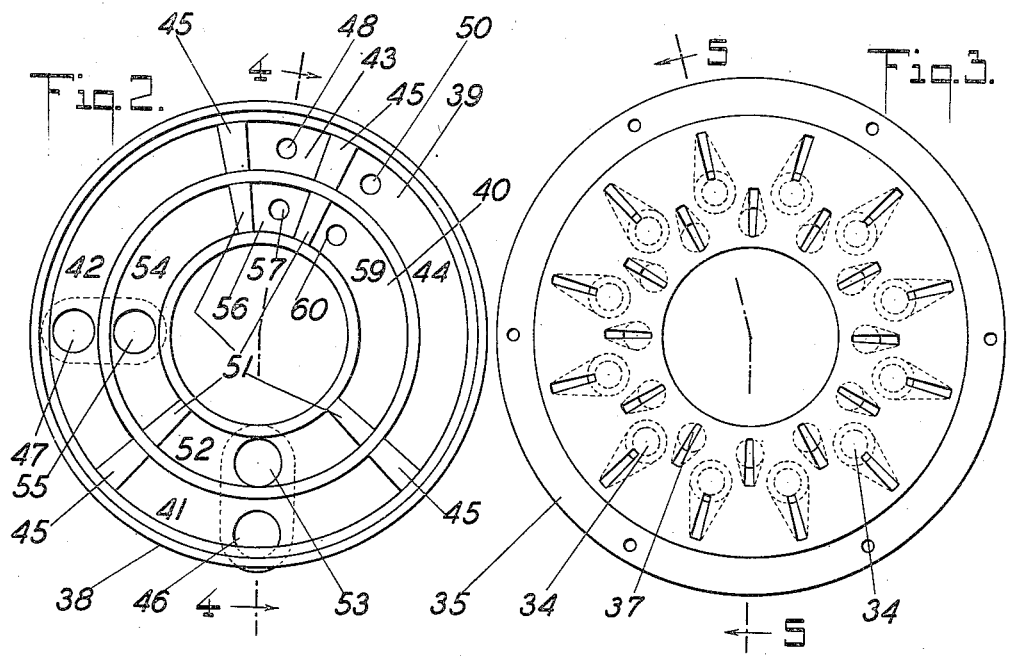
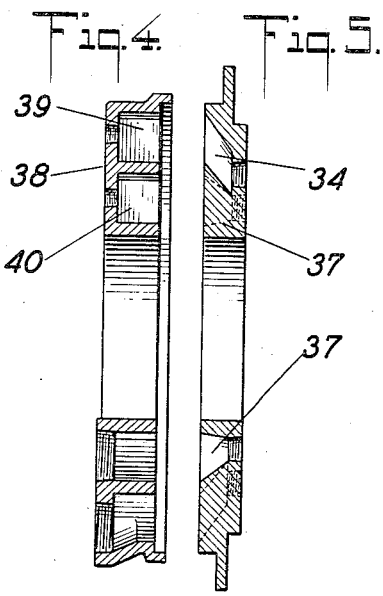
INVENTOR
FRANK W. BECRAFT
BY
ATTORNEY Patented Aug. 9, 1932

1,870,485

UNITED STATES PATENT OFFICE

FRANK W. BECRAFT, OF DENVER, COLORADO, ASSIGNOR, BY MESNE ASSIGNMENTS, TO THE DORR COMPANY, INC., OF NEW YORK, N. Y., A CORPORATION OF DELAWARE

MULTIPLEX ROTARY DRUM FILTER

Application filed October 17, 1930. Serial No. 489,335.

This invention relates to rotary filters and more particularly to multiplex rotary filters and multiplex valve structure adapted for use therewith.

Heretofore it has been the general practice to use a plurality of single drum filters thus involving a multiplication of parts and requiring a great deal of floor space. It had also been proposed to mount a plurality of rotary filter units to be rotated about the same axis by the same source of power but the connections for various purposes, such as withdrawing filtrate and removing the cake from the various units, were very complicated. According to the present invention these and other disadvantages are obviated.

An important object of the invention is to provide a multiplex rotary filter including a plurality of filter units connected with each other for simultaneous operation about a common axis and a multiple valve arrangement at one end of the combined units for effecting pressure variation at different stages of rotation. Further objects of invention relate to features of the multiple valve end of the rotary filter structure.

The objects of the invention may, in general, be attained by arranging end to end a plurality of rotary filter units and securing them together for rotation about a common axis by a single rotating means, and by providing at one end of the plurality of filter units a valve adapted to effect pressure variation at the filter units by varying their connections with outside pressure controlling means. Preferably the filter units are in stepped arrangement, that is an arrangement in which the diameters of the units increase progressively from one end to the other of the main filter structure, thus enabling the sets of pipes, through which pressure variation at the filter cells is effected, to be connected with ends of the filter units and therefore be arranged in cylinders about a common axis. With this arrangement the circularly, cylindrically or annularly arranged filter cells of any particular unit will not interfere with the pipes of the next larger or next smaller unit or the pipes of any other filter unit.

I have chosen for description herein the best embodiment of my invention of which I am at present advised but it is to be understood it is used for illustrative purposes and not limiting ones for obviously this invention is capable of other embodiments without departing from the spirit and scope thereof.

The embodiment selected is illustrated in the accompanying drawings in which

Fig. 1 is a longitudinal sectional view taken along a vertical plane passing through the axis of the drum structure;

Fig. 2 is a view of the valve cover or stationary part, looking at the inner side thereof;

Fig. 3 is a view of the valve seat or rotary part, looking at the outer side thereof;

Fig. 4 is a sectional view taken along the line 4—4 of Fig. 2; and

Fig. 5 is a sectional view taken along the line 5—5 of Fig. 3.

Referring to the drawings, 10 designates a duplex filter including two rotary filter units 11 and 12, of which the unit 11 is of smaller diameter than the unit 12. These units are secured together end to end and the duplex filter as a whole is supported by a hollow trunnion 13 projecting axially from the end of the filter element 11 and journalled in a support 14, and by a running ring 15 extending around the unit 12 and turning upon rolls 16 positioned on opposite sides of a vertical plane passing through the axis of the duplex filter. Preferably the ring is adjustably secured on the unit 12 by suitable means including adjusting wedges 17 and the rolls 16 are mounted in adjustable bearing blocks 18.

The unit 12 is made up of various parts including a drum with a cylindrical wall 19, preferably of sheet metal, having annular flanges at both ends, an annular end wall 20 secured to the flange at the free end of the unit and having a central opening of suitable diameter to provide for overflow at a suitable height over an annular lip 21 located at the edge of such central opening, and an annular end wall 22 serving also as an end wall of the unit 11 and having a central opening of sufficient diameter to enable substantially the same depth of pulp to be maintained in unit 11 as in unit 12 while permitting overflow into unit 12. It will be evident that the difference between the highest liquid level in unit 11 and the highest liquid level in unit 12 is substantially the same as the difference between the radii of the two units. Suitable liquid levels for the units 11 and 12 are indicated by lines 23 and 24, respectively. Suitable liquid levels may be obtained by regulating the rate of feed and the rate of withdrawal of the filtrate.

The unit 12, as here shown, is a filter of the internal type and includes a plurality of filter cells 25 arranged in succession and separated from each other in such a manner as to avoid leakage therebetween, and separated from the interior of the drum by suitably supported filter material 26 (Fig. 1). As here shown each of the filter cells 25 extends from one end to the other of unit 12. The filter unit 11 is also provided with filter cells arranged to correspond with the cells in the unit 12, and, at the end thereof distant from the unit 12, is provided with an annular wall 27 to which the hollow trunnion 13 is secured. The duplex filter may be held against movement along its axis by any suitable means such, for example, as flanges 28 projecting outwardly from the trunnion and receiving therebetween the bearing ring carried by the support 14. The filter may be rotated in any suitable manner as, for example, by means of a worm wheel 29 secured to the trunnion 13 and meshing with a worm 30 journalled in and held against longitudinal movement in the support 14 and actuated from any suitable source of power.

The material to be filtered contains solids in suspension and will hereinafter be referred to as pulp. The pulp to be filtered in the two filter units may be introduce through separate pipes 31 and 32, the first 31 passing through the opening in the outer end of the filter unit 12 and through the central opening of the wall 22 common to the two units and supplying pulp to the unit 11 and the second 32 passing only through the central opening of the wall 20 and supplying pulp to the unit 11. The actual filtration is effected by setting up suction in each of the filter cells 25 which will act during the passage of the filter section beneath the pulp in the corresponding unit to draw the liquid portion or filtrate through the filter material into and from the cells, thus leaving solids in the form of cake at the inner surface of the filter material.

To produce such suction and remove the filtrate from the cells 25, each of the cells of the filter unit 12 is connected at the end nearer the unit 11 with a conduit or pipe 33 extending outside of the unit 11 and beyond the end thereof which is secured to the trunnion 13, inwardly through the wall of the trunnion, and substantially parallel to the axis of the trunnion to connect with the inner end of a port or opening 34 in an annular valve seat or rotary valve part 35 fixed to the outer end of the trunnion 13 adjacent to the worm wheel 29. It will be seen that the portions of the pipes or conduits 33 extending along the unit 11 are arranged in generally circular or cylindrical form, the portions extending inwardly to the trunnion are in general radially arranged, and the parts at the interior of the trunnion are arranged in generally circular or cylindrical form, the corresponding ends of the ports 34 being arranged in a corresponding circle. Each of the cells of the filter unit 11 is connected with an individual pipe or conduit 36 and these conduits extend inwardly and radially along the outer end of the unit 11 into the trunnion 13 and then parallel to the axis of the revolving filter structure and inside of the group of pipes 33 for connection with the inner ends of a circularly arranged set of ports 37. For reasons to be brought out hereinafter, the annular space available for the pipes 33 and 36 within the trunnion 13 is rather restricted. In order to meet this condition the inner ends of the ports 34 and 37 are arranged in staggered relation and so that the two circles of ports are very close together.

At its outer side the rotary valve part 35 is closely engaged by a valve cover or stationary part 38 having circular channels or grooves 39 and 40 serving as ports and cooperating respectively with the outer ends of the ports 34 and 37, respectively. As illustrated in Fig. 2, the outer groove 39 is divided into four parts 41, 42, 43, and 44 by dams 45 which may be held in position in any suitable manner but must produce an effective seal between successive compartments. The part or compartment 41 is connected with a suction line 46 and it is during the passage of the outer ends of the ports 34 along this part that the principal part of the removal of the filtrate through the corresponding cells is effected. In the next compartment 42, there is a port 47 which may be closed in any suitable manner or which may, for example, be used for further removal of filtrate. In the next compartment 43, there is a port which is connected with a pressure line 48 so that the cake may be removed from the filter material by a quick blast of air. The next compartment 44 is ordinarily an idle one but is provided with a port 50 which may be connected with a suitable means for producing the desired variations of pressures.

In the same general manner, the inner groove or channel 40 is divided by dams 51 into a compartment 52 connected with a suction line 53, a compartment 54 provided with a port 55, a compartment 56 provided with a port 57 connected with a pressure line 58, and a compartment 59 which is ordinarily a dead area but is provided with a port 60 which may be utilized to produce some desired effect.

It is desirable to effect variations of pressure rapidly and for that reason the outer ends of the passages or ports 34 and 37 are preferably made in the form of radial slits of sufficient length to provide the same cross sectional area at the outer end as at the inner end. In view of the required length of slit it is necessary to offset the outer ends of the ports and passages, as indicated in Fig. 3, to prevent overlapping which would prevent independent control of the pressure conditions in the two sets of ports by means of the two grooves 39 and 40 and the compartments into which they are divided by dams. It should be understood that the passages or ports 34 and 37 are so shaped between their ends as to avoid excessive resistance to the flow of fluid therethrough.

As each cell of the two filter units reaches the top of its path, a blast of fluid under pressure enters it and blows the accumulated cake downwardly therefrom, the cake from the unit 11 falling into a chute 61 and the cake from the unit 12 falling into a chute 62 and the cake from the two chutes falling into a trough 63 on opposite sides of a partition 64. The trough 63 passes out through the outer end of the unit 12 and is mounted on a support 65, and at its other end at the farther end of the unit 11 is secured to a tube 66 which in a sense constitutes an extension of the trough 63 and extends outwardly through the hollow trunnion 13 inside the groups of pipes 33 and 36 and through the central openings of the valve members 35 and 38 and is supported by a frame or support 67. It will be evident that the trough 63 serves to support the chutes 61 and 62.

The trough 63 and the tube 66 form part of a conveying device which also includes reversely arranged helical blades 68 and 69 on opposite sides of the partition 64 and mounted on a shaft 70 journalled at the outer ends of the trough and tube at points 71 and 72 respectively and at an intermediate point in a bracket 73 in the unit 12 and adjacent to the partition 64. It will be noted that the inner wall of the chute 62 is so inclined as to prevent cake blown from the filter in the unit 12 from falling on the bracket. Upon turning the shaft 70 in the proper direction, the cake in the units 11 and 12 will be conveyed to the left and right, respectively, and discharged through an opening 74 in the bottom of the tube 66 at its outer end and through an opening 75 at the outer end of the trough 63. The shaft 70 may be driven in any suitable manner as, for example, by means of a bevel gear 76 on the shaft 70 meshing with a bevel gear 77 on a shaft 78 driven from any suitable source of power.

It should be understood that various changes may be made in the construction and arrangement of parts and that certain parts may be used without others, without departing from the true spirit and scope of the invention.

I claim:

1. The combination of a rotary filter having annularly arranged filter sections with the section at one end of the filter of less diameter than the next section, and means for effecting pressure variation at these filter sections including a valve at the end of the smaller of said sections and having a rotary part provided with openings arranged in concentric circles, and pipes extending from two successive circles of said openings to the ends of such filter sections of different diameters with the pipes connected with the larger section extending outside of and along the smaller section.

2. The combination of a rotary filter structure having at one end a hollow trunnion and comprising a plurality of filter sections arranged end to end, cake removing means extending through said trunnion and means for effecting pressure variation in said sections at different stages of rotation including a plurality of sets of pipes connected respectively with said sections and passing through said trunnion in closely grouped coaxial cylinders, with the pipes in successive groups in staggered and overlapped relation, a stationary valve member having annular channels divided by dams into sections certain of which are connected with pressure controlling means, and a rotatable valve member having passages with the ends at one side of such member arranged in concentric circles to receive the ends of said pipes and with the ends at the other side arranged concentrically but displaced radially of the valve member with reference to the other ends to coincide with said channels in the stationary member and avoid overlapping.

3. A filter comprising a plurality of abutting unequal sized drums rotatable as a unit, filter cells carried interiorly of said drums, means for alternately applying suction and blowback to said cells, means for rotating said drums, a filter cake discharge from said drums, and means for maintaining a filtrant bath in each of said drums.

4. The apparatus according to claim 3 with the addition of a common divisional wall between abutting drums.

5. The apparatus according to claim 3 with the addition of an annular divisional wall between abutting drums.

6. The apparatus according to claim 3 with the addition of an annular partition between abutting drums to form an overflow whereby filtrant from one drum, may overflow into its next adjacent drum, the latter drum having an overflow level below that of the preceding drum.

7. The apparatus according to claim 3 with the addition of an annular partition to form a weir plate between abutting drums, and an annular end plate for the larger drum having an opening larger than the opening of said weir plate to serve as an overflow for the larger drum, so as to maintain the filtrant bath in the smaller drum at a higher level than the bath in its abutting larger drum.

In testimony whereof I affix my signature.

FRANK W. BECRAFT.